(12) United States Patent
Ganapathy et al.

(10) Patent No.: US 6,529,284 B1
(45) Date of Patent: Mar. 4, 2003

(54) EFFICIENT RENDERING OF MASKS TO A SCREENED BUFFER USING A LOOKUP TABLE

(75) Inventors: Praveen K. Ganapathy, Karnataka (IN); Venkat V. Easwar, Cupertino, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/392,135

(22) Filed: Sep. 8, 1999

Related U.S. Application Data
(60) Provisional application No. 60/100,544, filed on Sep. 16, 1998.

(30) Foreign Application Priority Data

Aug. 7, 1998 (IN) .................................................. 1783/98

(51) Int. Cl.[7] .............................................. G06F 15/00
(52) U.S. Cl. ...................... 358/1.11; 358/1.9; 345/551; 345/563

(58) Field of Search ................................. 358/1.11, 1.9; 345/551, 563; 707/529, 442; 382/175, 176, 257

(56) References Cited

U.S. PATENT DOCUMENTS 6,100,905 A * 8/2000 Sidwell ...................... 345/559

\* cited by examiner

*Primary Examiner*—Mark Wallerson
*Assistant Examiner*—Twyler Lamb
(74) *Attorney, Agent, or Firm*—Charles A. Brill; Wade James Brady III; Frederick J. Telecky, Jr.

(57) ABSTRACT

A method and system for expanding a pixel bitmap mask. The pixel bitmap mask (102) is expanded by the use of a lookup table (104) to create an m*n bit expanded mask, where m is the depth of a screen and n is the number of pixels described by the original pixel bitmap mask (102). The expanded mask is logically ANDed with a foreground screen (106). The inverse of the expanded mask is logically ANDed with existing data in a screen buffer (108). The results of the two AND operations are logically OR'd to create a new screen buffer that is eventually sent to a printer.

9 Claims, 1 Drawing Sheet

EFFICIENT RENDERING OF MASKS TO A SCREENED BUFFER USING A LOOKUP TABLE

This application claims priority under 35 USC § 119(e)(1) of provisional application No. 60/100,544 filed Sep. 16, 1998.

FIELD OF THE INVENTION

This invention relates to the field of printing systems, more particularly to the compilation of pixelated images for printing.

BACKGROUND OF THE INVENTION

Printing technology is undergoing a revolution as the inexpensive computational power developed for the desktop computer market is applied to the printing industry. Paralleling this growth are the skyrocketing expectations of consumers. While just a few short years ago the goal was to find an acceptable replacement for typewritten text, now the demand is for photographic quality reproduction of both scanned images and computer-generated graphics. Meeting this demand required a significant increase in the resolution of the printed images—both spatial resolution and color depth—that demanded the application of massive amounts of processing power and memory.

While image quality continues to increase, consumers continue to demand higher and higher print speeds from today's desktop printers. This expectation also leads to greater demands on the throughput of the print engine's processor. Thus, there is a need in the art for systems and methods to increase the efficiency and throughput of print engines.

SUMMARY OF THE INVENTION

Objects and advantages will be obvious, and will in part appear hereinafter and will be accomplished by the present invention which provides a method and system of efficiently rendering masks/bitmap fonts. The method comprises the steps of providing an n-bit mask, using the n-bit mask to address a lookup table, and reading an expanded mask from the lookup table. The lookup mask is comprised of m*n bits, each bit in a sequential group of m bits in the expanded mask corresponding to a bit in the n-bit mask. Typically each of the n bits in the original mask is replicated m times, but alternate embodiments replicate the logical inverse of the original bit m times.

According to another embodiment of the disclosed invention, a processor for rendering data into a printer buffer is disclosed. The processor comprises a memory lookup table for receiving an input mask and outputting an expanded mask, and at least one ALU for merging said expanded mask with a screened band buffer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
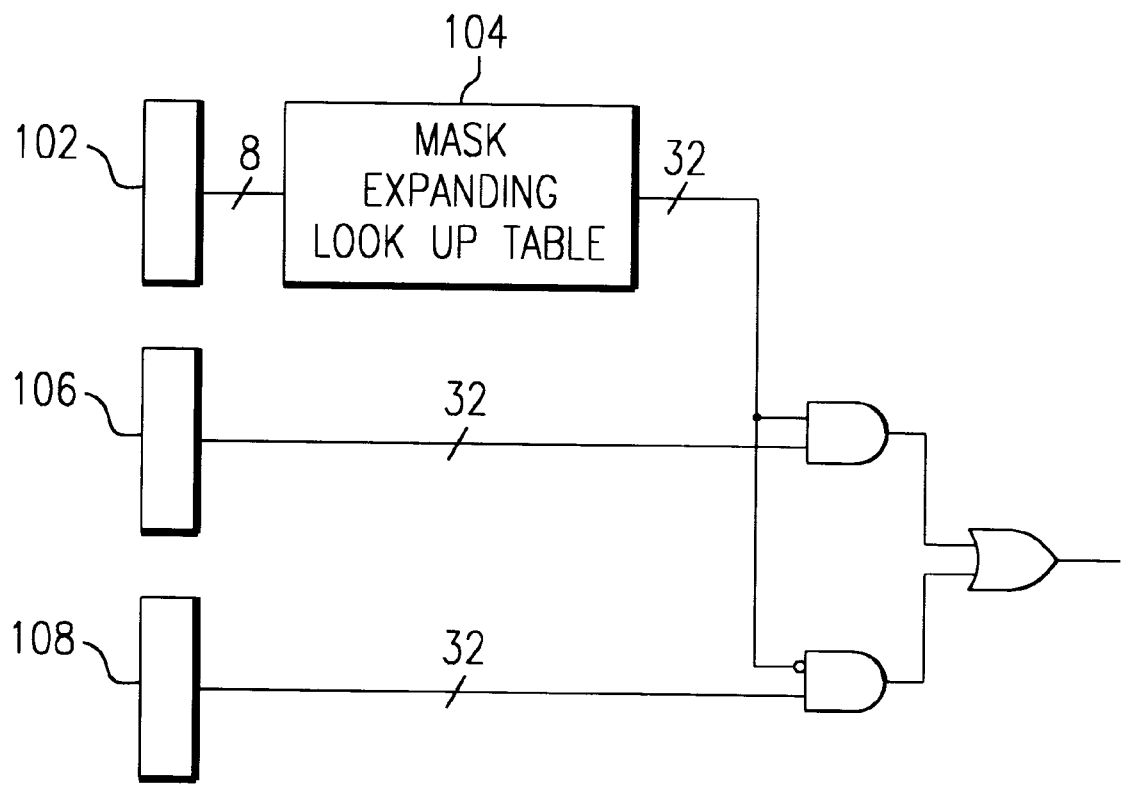
FIG. 1 is a schematic representation of the operation of the mask/merge operation according to one embodiment of the disclosed invention.

Image rendering processors compile images to be printed by compiling multiple components of the image. This compilation is performed by merging each image component into a printer buffer. The printer buffer is rendered, that is the component images are merged into the printer buffer, by a series of masking and logical ORing operations which add image objects to the information already contained in the print buffer.

For example, text is added to a portion of the print buffer using a mask and information as to where the character of a given font and size is to be located. The mask is a 1 bit per pixel bitmap that specifies whether a particular pixel is to be painted or not. Although easily reversed, for the purposes of this disclosure a logical "1" at a given mask location indicates that pixel is to be printed, or "painted," with the foreground color. Using this example, the value assigned a particular buffer location is equal to:

$$\text{buffer} = \text{background} \ \& \ \sim\text{mask} + \text{foreground} \ \& \ \text{mask}$$

where background is the characteristic of the image pixels not painted by the text being printed, and foreground is the characteristic of the image pixels that are to be painted by the text being printed. In a simple example, buffer is a 1-bit memory location assigned to a pixel that retains a "0" if a character of text does not cover the pixel, and is assigned a "1" if a character of text does cover the pixel. Multiple bit buffer locations are required to render gray-level and color images.

Once the bitmap representing the image to be printed is rendered, it is transferred to the printer and used to determine how much of each ink color a given location on the document being printed receives. While the amount of ink a given region of a document receives determines how saturated a region will appear, it is difficult to vary the amount of ink applied to a particular region/pixel location. For this reason, printers typically deposit ink in small clumps, or dots, within a region that is to be uniformly shaded. Lightly shaded regions have fewer and smaller dots, while darker areas have larger dots in greater numbers.

A screening pattern is used to translate an intensity value to the ink dot pattern. A screen is a periodic pattern that is fixed for a given gray level. The pattern is typically rectangular, although other shapes have been used. The pattern is usually much smaller than the document to be printed and is replicated, or tiled, across the document. Small screen sizes require less memory to store, but since the irregular dot pattern repeats each screen the smaller screens run the risk of creating more noticeable artifacts.

For the purposes of this disclosure, it is assumed that the screen has a depth of four bits per pixel, although it should be understood that more or less bits per pixel may be used in some applications—although screens that are eight bits deep will not reap efficiency gains as large as the systems with a screen depth of only four bits.

Using a 32-bit processor, such as the multiple video processors (MVP) available in the TMS320C82 digital signal processor, eight pixels must be masked or merged simultaneously in order to maximize the throughput of the processor. However, since the mask is only one bit per pixel, the mask must be expanded by replication before the mask and merge operation. For example, an 8-bit mask equal to 1010 1010^b is expanded to a 32-bit mask equal to 1111 0000 1111 0000 1111 0000 1111 0000^b.

Table 1 is an abbreviated list of expanded bit masks.

TABLE 1

| Bit Mask | Expanded Mask |
|---|---|
| 00000000 | 0x0 |
| 00000001 | 0xF |
| 00000010 | 0xF0 |
| 00000011 | 0xFF |
| 00000100 | 0xF00 |
| ... | ... |
| 11111110 | 0xFFFFFFF0 |
| 11111111 | 0xFFFFFFFF |

The mask could be expanded using the following algorithm:

expanded_mask=0;

for (i=7; i>=0; - - - i) expanded_mask=(expanded_mask<<4)|((mask&(1<<i))?0xf:0);

This approach, however, consumes a large number of ALU clock periods. This is especially true when using 32-bit processors such as the MVP since they do not directly support operations on nibble-sized data words.

According to one embodiment of the disclosed invention, a lookup table is used to store all possible combinations of masks, thereby saving a large number of ALU clock cycles each time the mask must be expanded. Since there are only 256 possible mask patterns ($2^8$), each requiring the storage of a 4-byte expanded mask, the lookup table only consumes 1 kilo-byte of memory.

FIG. 1 shows a schematic representation of the operation of the mask/merge operation. Register 102 holds an n-bit mask (shown as an 8-bit mask) indicating which of n pixels are to be painted with a foreground pattern. The n-bit mask value is used as an address, or offset, into the mask expanding lookup table 104. The value stored at the address pointed to by the n-bit mask is an m*n-bit expanded mask. The m*n-bit expanded mask is comprised of n sets of m bits, where the bits in a given set are all equal to the corresponding bit in the n-bit mask.

The m*n-bit expanded mask is logically ANDed with a foreground pattern held by register 106. The foreground pattern is m-bits deep for n pixels. The inverse of the m*n-bit expanded mask is logically ANDed with the existing data in the screened band buffer, held in register 108, to eliminate data in the pixels to be overwritten by the mask. The results of the two logical AND operations are logically OR'd to produce the updated screened band buffer. The updated screen buffer now contains foreground data for the pixels indicated by the mask, and background data for the remaining pixels.

This masking and merging operation is described as:

processed_buffer=(expanded_mask & screen)|(raw_buffer & ~expanded_mask)

The operation described above is efficiently implemented on a 32-bit processor like the MVP using the following code:

*Gx_mask_lut_index=ub\*Ga_mask++* screen=\*La_screen_ptr++

*expanded_mask=\*(Ga_mask_lut_base+[Gx_mask_lut_index])* raw_buffer=\*La_buffer_ptr;

processed_buffer=(expanded_mask & screen)|(raw_buffer & ~expanded_mask)

\*La_buffer_ptr++=processed_buffer

Thus, although there has been disclosed to this point a particular embodiment for an efficient method and system for expanding a mask and masking/merging foreground and background patterns, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of expanding a pixel bitmap mask, said method comprising the steps of:

providing an n-bit mask;

addressing a lookup table using said n-bit mask;

reading an expanded mask from said lookup table, said expanded mask comprised of m*n bits, forming n groups of m sequential bits, each bit in a sequential group of m bits corresponding to a bit in said n-bit mask to yield an expanded mask having each of said m bits in a group of m sequential bits within said expanded mask equal to the logical inverse of the corresponding bit in said n-bit mask.

2. The method of claim 1, wherein said reading step yields an expanded mask having each of said m bits in a group of m sequential bits within said expanded mask equal to its corresponding bit in said n-bit mask.

3. The method of claim 1, wherein said reading step yields an m*n-bit expanded mask wherein m is equal to the depth of a screen.

4. The method of claim 1, wherein providing step comprises providing an 8-bit mask, each of said 8 bits in said mask representing whether a corresponding pixel is to receive a foreground color.

5. The method of claim 1, wherein reading step comprises reading an expanded 32-bit mask.

6. The method of claim 1, wherein reading step comprises reading an expanded 32-bit mask comprised of 4 bits of data for each of 8 pixels.

7. A processor for rendering data into a screened band buffer, said processor comprising:

a memory lookup table for receiving an input mask and outputting an expanded mask; and at least one ALU for merging said expanded mask with said screened band buffer.

8. The processor of claim 7, wherein said input mask is 8 bits wide and is comprised of one bit for each of 8 image pixels.

9. The processor of claim 7, wherein said expanded mask is 32 bits wide and is comprised of 4 bits for each of 8 image pixels, each of said 4 bits for each of 8 image pixels being equal to one bit of said input mask.

\* \* \* \* \*